US012688266B2

(12) United States Patent
Schmitt et al.

(10) Patent No.: US 12,688,266 B2
(45) Date of Patent: Jul. 21, 2026

(54) OPERATING DEVICE FOR OPERATING TEXTILE MACHINES AND METHOD FOR OPERATING TEXTILE MACHINES

(71) Applicant: Maschinenfabrik Rieter AG, Winterthur (CH)

(72) Inventors: Max Schmitt, Zürich (CH); Cornelius Niemeyer, Allensbach (DE); Dominic Wettstein, Zürich (CH)

(73) Assignee: Maschinenfabrik Rieter AG, Winterthur (CH)

( * ) Notice: Subject to any disclaimer, the term of this patent is extended or adjusted under 35 U.S.C. 154(b) by 496 days.

(21) Appl. No.: 18/043,135

(22) PCT Filed: Aug. 30, 2021

(86) PCT No.: PCT/EP2021/073831
§ 371 (c)(1),
(2) Date: Feb. 27, 2023

(87) PCT Pub. No.: WO2022/043540
PCT Pub. Date: Mar. 3, 2022

(65) Prior Publication Data
US 2023/0323571 A1     Oct. 12, 2023

(30) Foreign Application Priority Data

Aug. 31, 2020    (EP) ..................................... 20193620

(51) Int. Cl.
*G06F 21/31* (2013.01)
*D01H 13/32* (2006.01)
*G05B 15/02* (2006.01)

(52) U.S. Cl.
CPC ............. *G06F 21/31* (2013.01); *D01H 13/32* (2013.01); *G05B 15/02* (2013.01); *D01H 2700/22* (2013.01); *G06F 2221/2149* (2013.01)

(58) Field of Classification Search
CPC . G06F 21/31; G06F 2221/2149; D01H 13/32; D01H 2700/22; G05B 15/02
See application file for complete search history.

(56) References Cited

U.S. PATENT DOCUMENTS 5,517,404 A * 5/1996 Biber ..................... D01H 13/32
                                                          700/130
5,805,452 A * 9/1998 Anthony .............. G05B 13/026
                                                          700/142

(Continued)

FOREIGN PATENT DOCUMENTS

BE          1003474 A3       3/1932
DE      102006007992        10/2006

(Continued)

OTHER PUBLICATIONS

PCT Search Report, Nov. 23, 2021.
Indian Hearing Notice, Aug. 1, 2024.

*Primary Examiner* — William L Bashore
*Assistant Examiner* — Gregory A Distefano
(74) *Attorney, Agent, or Firm* — Dority & Manning, P.A.

(57) ABSTRACT

A first operating device for operation of a textile machine includes a basic mode function and an expert mode function for operation of the textile machine by a user. A switching function allows the user to switch between the basic and expert mode functions. A remote transmitting function provides for communication to a second operating device assigned to a remote textile machine so that the user at the textile machine can operate the remote textile machine in the basic or expert mode via the first and second operating devices. A remote receiving function provides for communication from the second operating device assigned to the remote textile machine so that a remote user can operate the (Continued)

textile machine in the basic mode or expert mode from the remote textile machine via the second and first operating devices.

13 Claims, 6 Drawing Sheets

(56) References Cited

U.S. PATENT DOCUMENTS

| | | | | |
|---|---|---|---|---|
| 5,881,662 | A * | 3/1999 | Bastian | G07C 9/20 |
| | | | | 112/102.5 |
| 2008/0263636 | A1* | 10/2008 | Gusler | H04L 63/1466 |
| | | | | 726/4 |
| 2014/0108985 | A1* | 4/2014 | Scott | G05B 19/4188 |
| | | | | 715/771 |
| 2014/0344922 | A1* | 11/2014 | Lam | H04W 12/08 |
| | | | | 726/19 |
| 2017/0146989 | A1* | 5/2017 | Locatelli | G05B 23/0283 |
| 2021/0377018 | A1* | 12/2021 | Lawrence | H04L 9/3271 |
| 2022/0081807 | A1* | 3/2022 | Niemeyer | G06F 3/0482 |

FOREIGN PATENT DOCUMENTS

| | | | | | |
|---|---|---|---|---|---|
| DE | 102009018187 | | 10/2010 | | |
| EP | 1186977 | A2 | 3/2002 | | |
| EP | 2108723 | | 10/2009 | | |
| EP | 2136274 | | 12/2009 | | |
| EP | 2573236 | | 3/2013 | | |
| EP | 2869149 | A1 | 5/2015 | | |
| EP | 3165976 | | 5/2017 | | |
| EP | 3170778 | | 5/2017 | | |
| EP | 3336625 | A1 | 6/2018 | | |
| GB | 2469734 | A * | 10/2010 | | D01H 13/32 |
| WO | WO02/086214 | A2 | 10/2002 | | |
| WO | WO2012127409 | | 9/2012 | | |
| WO | WO-2020070642 | A1 * | 4/2020 | | D01H 13/32 |

* cited by examiner

🔒Login

In order to make any changes to the
machine, you need to log in.                          105

User        | John              ⌄ |

Password    | **** |

| ✕ Cancel |        | ✓ Log In |

70 | 09:24 N.17 | ▷ ⇄ Automatic | ⊗ 3 min ago Table Funnel Error | Current Recipe Cotton Special Mix | ⓘ Help | ⊕ EN | ⚠ | -❋ Simple | 80

≡ Menu   ⟩ ⚠ Notifications    4                    ← Back | → Forward  90

| | ID | Type | Description | Date/Time ↓ | |
|---|---|---|---|---|---|
| ⚠ | 2845 | Drafting Unit | Check Drafting Unit... | 02.03.2018 09.22.13 | ☐ Group by ID |
| ⊗ | 1575 | Table Funnel Error | Remove choke... | 02.03.2018 09.21.08 | |
| ⊗ | 4568 | Overlap | Overlap in section... | 02.03.2018 09.18.34 | |
| ⚠ | 1428 | Missing Empty Can | Empty can is missin... | 02.03.2018 09.15.00 | More Info |

More Info
⤳ View Analysis
↺ View History

OPERATING DEVICE FOR OPERATING TEXTILE MACHINES AND METHOD FOR OPERATING TEXTILE MACHINES

RELATED APPLICATIONS

The present application claims priority to PCT Application Serial Number PCT/EP2021/073831, filed on Aug. 30, 2021, which claims priority to EP Application No. 20193620.0, filed on Aug. 31, 2020. Both applications are incorporated by reference herein.

TECHNICAL FIELD

The invention relates to an operating device for operating textile machines and a method for operating textile machines.

BACKGROUND

An operating device for a textile machine is known, for example, from EP1186977A2. In this case, a screen is used for monitoring, controlling and operating the machine in order to be able to display information masks and input masks. The selection of the information masks and operating masks is performed by a main operating mask, which has a plurality of touch panels for selecting the information masks and input masks. In this respect, each of the stored masks can be accessed directly via a key command.

EP2869149A1 discloses an operating device of a textile machine on which different information is displayed on different regions, wherein access rights for screens and levels are assigned.

WO2012127409 discloses a warp knitting machine and a method for access for control of the machine. In this case, remote access is provided in order to take over the control over a predetermined number of functions. As a unit from which it is remotely controlled, a computer or a mobile telephone, which is connected to the machine via a network, is provided. The machine is provided with a display and a web server, such that the machine can be accessed by an IP protocol from the remote computer.

DE102006007992 discloses a textile machine installation with a plurality of cross-linked textile machines, wherein the textile machines may be operated on a local operating device and/or on a remote operating device.

EP2573236 discloses a textile machine system comprising multiple textile machines, wherein each of the textile machines comprises at least one textile processing unit and a management device that collects and manages an operating data record via the textile processing unit. The management device comprises a display section indicating the operating data set and a communication section that sends and receives the operating data record to the management device of another textile machine. The display section can display the operating data records via the textile processing units of multiple textile machines within a screen.

EP2108723 further discloses a textile machine system with multiple automatic winders. Each of the automatic winding devices comprises a plurality of yarn winding units, a frame control device and a ZigBee terminal. The frame control device manages information about the yarn winding unit and controls the yarn winding unit. The ZigBee terminal can perform wireless communication directly with a ZigBee terminal provided in another automatic winder. The frame control device sends and receives winding information to and from the frame control device provided in another textile machine by wireless communication through the ZigBee terminals.

BE 1003474 A3 shows, for example, a device with a portable operating unit for a group of textile machines shows. This device discloses a device for operating weaving machines with a portable operating unit, which can be connected alternately to different machines of a group in a transmitting manner. The essential movement sequences of the weaving machine are triggered by buttons on the operating unit. The connection between the weaving machine and the portable operating unit is made with a plug-in connection or wirelessly. In the case of the wireless variant, a code is input by the operator, which code specifies to which of the machines of a group the operating unit is to be connected wirelessly by radio. The device according to BE 1003474 A3 further contains electronic detection means with which the portable operating units are identified in connection with one of the weaving machines.

EP3170778 discloses a textile machine management system comprising a plurality of textile machines, each comprising a plurality of fiber processing units, wherein a control device is configured to control the fiber processing units and one or more shared devices provided in common on all or some of the fiber processing units, and a management device configured for managing the textile machines. The management device comprises a communication unit configured for mutual communication with a terminal comprising a display unit configured to display information, and a function provision unit configured to provide the terminal with a plurality of functions for managing one or more of the fiber processing units and/or one or more of the shared devices. The management device or the terminal comprises a display controller configured to cause the display unit to display a screen that corresponds to each function provided by the function providing unit.

EP3165976 discloses a method for operating a display and operating device coupled to at least two spinning preparation machines, which has a step of displaying machine display sections in a non-lifting state, each of which represents a spinning preparation machine coupled to the display and operating device, on a display section of the device. Furthermore, it is possible to select a machine display section by means of an operating section of the device. Each of the aforementioned methods can have multiple authorization levels. In this case, the method has a step to enable a user to set an authorization level by means of the device. Before the step of displaying the first or second action selection display, the method further comprises a step of selecting executable first and/or second actions based on the set authorization level. Finally, there is still a step of deactivating or suppressing the display of those action display sections whose assigned first or second actions are not executable by the set authorization level. Thus, only the actions that may be executed can be displayed to the current user on the basis of the currently set authorization level. Operating errors can thus be minimized and operations of untrained personnel may be prevented, which increases operational safety. The aforementioned authorization levels may also be more than three. Moreover, the authorization levels may also include roles. For example, a role can include responsibility for only a part of the coupled spinning preparation machines. The following example is to illustrate this: It can be provided that two drawing frames are operated independently of one another.

DE102009018187 describes a device for operating and display units on textile machines and systems. In order to enable a unique user identification and to operate in a contactless manner and automatically, reading devices are present in the region of the machines and systems, with which reading devices the data of information carriers can be detected or persons can be identified directly. The information obtained in this way can be input into an evaluation device, which outputs electrical signals for an operating and display device.

EP2136274 shows an electronic device adapted to be worn on an arm of an operator and used in the field of automated manufacturing in the textile industry. The device comprises a rechargeable battery and a touchscreen and is configured for wireless communication with machine automation and control devices, along with centralized and distributed computers for controlling production operations.

An operating and display device according to DE102009018187 or the electronic device according to EP2136274 for a textile machine does not enable a basic mode and an expert mode, wherein an authorization is required for expert mode but not for basic mode. Such devices also do not enable both an operation of a remote textile machine and an operation of the textile machine by a remote user.

SUMMARY OF THE INVENTION

The invention provides an operating device for a textile machine and a method for operating a textile machine, which overcome at least certain disadvantages of the prior art. The invention is based in particular on providing an operating device for a textile machine and a method for operating a textile machine, which improve the flexibility for operating a textile machine.

The objects are achieved by an operating device for a textile machine and a method for operating a textile machine having the features described and claimed herein.

An operating device for operating textile machines has a switching function for switching the operating device between a basic mode and an expert mode, wherein basic mode provides a basic operating mask for the basic operation of a textile machine by a user, and expert mode provides an expert operating mask for expert operation of the textile machine by the user. The operating device has an authorization function for authorizing the user, and the switching function is designed to require the authorization of the user for switching into expert mode. The operating device has a remote transmission function for operating a remote textile machine by the user, which remote transmission function is designed to create a communication connection to the remote textile machine for operating the remote textile machine by the user. The operating device has a remote receiving function for operating the textile machine by a remote user, which remote receiving function is designed to receive a communication connection from a remote operating device to operate the textile machine by the remote user. The operating device enables flexible operation of textile machines, whether a textile machine is assigned to the operating device, but also from remote textile machines. The operation is also made available starting from a spinning mill control center or a mobile operating device. By means of the option of switching between a basic mode and an expert mode, the operating device can be adapted to the tasks of a user, which may be different, for example, between a shift supervisor and a simple operator. Basic mode is available without authorization. Both the operation of a remote textile machine and the operation of the textile machine by a remote user is made possible. Basic mode can comprise, for example, emergency or warning functions of the textile machines, while expert mode can comprise functions for adapting machine parameters. A spinning mill with a plurality of textile machines can be equipped with a plurality of such operating devices in order to enable a basic or expert operation of the textile machines of the spinning mill by each of such operating devices.

In one embodiment, the remote transmission function is designed to create the communication connection to the remote textile machine via an operating device or via a control device of the remote textile machine. Existing infrastructure can be used to create a communication connection to the remote textile machine.

In one embodiment, the remote transmission function is designed to require the authorization of the user for the creation of the communication link. The operation of a remote machine is adapted to safety specifications.

In one embodiment, the remote transmitting function is designed to require expert mode for the creation of the communication link. The operation of a remote machine is adapted to tasks of a user.

In one embodiment, the remote transmission function is designed to carry out an authorization check for the creation of the communication link, in particular depending on the remote operating device or the remote control device. This can be dependent on whether the remote operator operating device/control device is free or occupied. This can be dependent on the user and/or the machine type, wherein certain users for certain machines have limited operation or no operation at all.

In one embodiment, the remote transmission function is designed to create multiple communication connections for operating multiple remote textile machines, in particular via corresponding remote operating devices or via corresponding remote control devices. For example, the same machine types may be operated simultaneously.

In one embodiment, the remote receiving function is designed to require or ensure basic mode for receiving the communication link. For example, the operating device can be locked to receive a communication connection if it is switched to expert mode. For example, the operating device can be switched to basic mode in order to enable the reception of the communication link.

In one embodiment, the remote receiving function is designed to reset an authorization of the user when the communication link is received. For example, a higher-level shift supervisor of a simple operator can withdraw the authorization.

In one embodiment, the remote receiving function is designed to wait for a time-limited user acknowledgment to reset an authorization of the user and then to reset the authorization of the user upon receipt of the communication link. For example, the authorization can be taken over by a user if such person has forgotten to reset it and moved away from the operating device.

In one embodiment, the operation of the textile machine is dependent on an authorization level assigned to the user or the remote user. The options for operating textile machines may be adapted, for example, to tasks of a shift supervisor and to tasks of a simple operator.

In one embodiment, one or more functions of the operating device are dependent on information stored in a spinning mill control center, in particular one or more of the following functions: the authorization function, the remote transmission function, the remote receiving function, in particular depending on an authorization level of the user or the remote user stored in the spinning mill control center.

The spinning mill control center can comprise a user database that assigns an authorization level to users.

In one embodiment, the operating device is designed to indicate whether the operating device is switched to basic mode or to expert mode, and/or to indicate whether there is a communication link from a remote operating device. The user of the operating device is informed about the operating state of the operating device.

In one embodiment, the operating device is designed such that the setting of parameters of the textile machine is provided to operate the textile machine and/or the remote textile machine.

In one embodiment, the operating device is designed such that, for operating the textile machine, information about the textile machine and/or via the remote textile machine is provided, wherein the information comprises alarms and/or warning messages, in particular depending on whether the information on the textile machine or on the remote textile machine is related, in particular further depending on whether the operating device is switched to basic mode or to expert mode.

With a method for operating textile machines, an operating device is assigned to a textile machine. In the operating device, a switching function for switching the operating device between a basic mode and an expert mode is activated, wherein basic mode provides a basic operating mask for the basic operation of the textile machine by a user, and expert mode provides an expert operating mask for expert operation of the textile machine by the user. An authorization function for authorizing the user is activated in the operating device, and the switching function is designed such that the authorization of the user is required for switching into expert mode. In the operating device, a remote transmission function is activated for operating a remote textile machine by the user, which remote transmission function is designed to create a communication connection to the remote textile machine for operating the remote textile machine by the user of the operating device. In the operating device, a remote receiving function is activated for operating the textile machine by a remote user, which remote receiving function is designed to receive a communication connection from a remote operating device to operate the textile machine by the remote user.

In one embodiment, the remote transmission function is designed to create the communication connection to the remote textile machine via an operating device or via a control device of the remote textile machine.

BRIEF DESCRIPTION OF THE FIGURES

Further advantages of the invention are described in the following exemplary embodiments. In the figures:

FIG. 3 shows the basic operating mask with a warning message;

FIG. 4 shows the basic operating mask with an alarm signal;

FIG. 7 shows a dialog window for authorizing a user;

FIG. 8 shows a list of different messages;

Figures 1, 2:
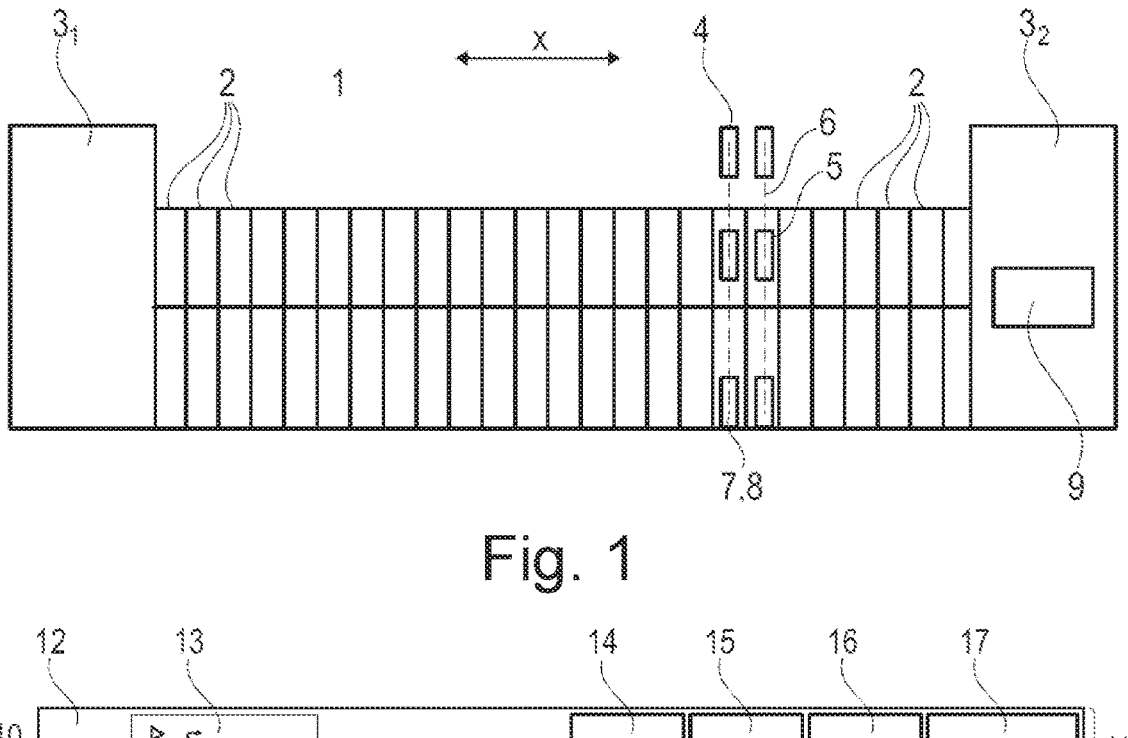
FIG. 1 schematically shows a ring spinning machine with an operating device.
FIG. 2 shows a basic operating mask of the operating device for operating a textile machine in a basic mode.

The same features are provided with the same or similar reference signs in different figures.

DETAILED DESCRIPTION

Reference will now be made to embodiments of the invention, one or more examples of which are shown in the drawings. Each embodiment is provided by way of explanation of the invention, and not as a limitation of the invention. For example features illustrated or described as part of one embodiment can be combined with another embodiment to yield still another embodiment. It is intended that the present invention include these and other modifications and variations to the embodiments described herein.

FIG. 1 schematically shows a ring spinning machine 1, which has a large number of Spinning positions 2 arranged next to one another. The Spinning positions 2 are arranged in a longitudinal direction x of the ring spinning machine 1 between a head $3_1$ and a foot $3_2$. The head $3_1$ and the foot $3_2$ of the ring spinning machine 1 may contain bearings, drives, controllers, etc., which are necessary for the operation of the machine. As is schematically illustrated at two Spinning positions 2 illustrated in FIG. 1, the Spinning positions 2 may comprise a roving bobbin 4, which is arranged above a drawing frame 5. A roving 6 is wound on the roving bobbin 4. The roving 6 runs from the roving bobbin 4 via the drawing frame 5, where it is stretched, and is guided via a thread guide to a yarn forming element. A circumferential ring winds the finished yarn onto a cop 7. The cop 7 is placed on a spindle 8.

As is illustrated schematically in FIG. 1, an operating device 9 according to the invention for operating the ring spinning machine 1 is assigned to the ring spinning machine 1. The operating device 9 is at the foot $3_2$ the ring spinning machine 1. In another embodiment, the operating device 9 can be at the head $3_1$ of the ring spinning machine 1. In another embodiment, the operating device 9 can be arranged on an operating panel, which is set up in the vicinity of the ring spinning machine 1. In another embodiment, the operating device 9 can be designed as a mobile device, for example as a tablet computer, mobile radio device, etc. In another embodiment, the operating device 9 can be assigned to the ring spinning machine 1 in another manner.

The ring spinning machine 1 of FIG. 1 is referred to as an example of a textile machine T1, T2, T3. In other embodiments, the operating device 9 can be designed to operate any textile machine T1, T2, T3 such as a bale opener, a drawing frame, a carder, a combing machine, a final spinning machine such as a rotor spinning machine, an air spinning machine, etc., a flyer, a winding machine, etc.

The operating device 9 comprises a user interface in order to enable a user to operate a ring spinning machine 1 or a textile machine T1, T2, T3. The user interface comprises a display device and an input device, which may be designed, for example, as a touchscreen, as a monitor and a keyboard/mouse, etc. The operating device 9 comprises software and hardware, in particular stored software instructions that are executable on one or more processors in order to provide necessary functions. In one embodiment, the operating device 9 comprises a web browser to display information and to enable the user to operate the ring spinning machine 1 or a textile machine T1, T2, T3.

The operating device 9 has a switching function for switching the user interface of the operating device 9 between a basic mode and an expert mode. Basic mode provides a basic operation of the ring spinning machine 1 or a textile machine T1, T2, T3 by a user. Expert mode provides an expert operation of the ring spinning machine 1 or a textile machine T1, T2, T3 by the user.

FIG. 2 schematically shows a basic operating mask 10 of the user interface of the operating device 9 with operating elements for operating the ring spinning machine 1. In other embodiments, the basic operating mask 10 is correspondingly adapted to operate a relevant textile machine T1, T2, T3.

The basic operating mask 10 displays essential information and functions, which are necessary for daily interaction with the ring spinning machine 1, to a simple and less trained workers. Thus, the basic operating mask 10 contains a very limited amount of information and interaction options and is displayed if the operating device 9 is switched to basic mode in order to provide a user with a basic operation of the ring spinning machine 1.

Specifically, the basic operating mask 10 contains a header 11, a notification region 20, an operating data region 30 for displaying operating data of the machine and a machine visualization region 40.

The header 11 contains an indication 12 of the machine type, machine number and the current time; the operating state button 13 for changing the operating state of the ring spinning machine 1 (which can be read-only in basic mode); a help button 14 in order to call up a help page or an operating manual or to create a screen shot; a language selector button 15 for setting the language of the user interface of the operating device 9; an authorization button 16 for the access to an authorization function of the operating device 9 for authorizing a user and for retrieving information about the current user; and a switch button 17 for accessing a switching function of the operating device 9 for switching the operating device 9 from basic mode into expert mode.

The notification region 20 can contain one or more of the following messages: alarm messages, warning messages and displays of information. Examples of this message are explained in the following figures.

The operating data region 30 contains an illustration of operating data of the ring spinning machine 1. Operating data of the machine may comprise key production figures such as the current production status regarding machine efficiency 31, "machine efficiency," production per hour or productivity, if applicable, related to a shift 32, "production per h," quality status 33, "quality CV," mean time between assists 34, "MTBA" (mean time between assists), etc. A classification of the operating data can be supported visually, for example by colors and various symbols, such as smileys, etc., as to whether the value is good, average or not good. The operating data 31, 32, 33, 34 may be designed as elements that can be selected by the user in order to display further information such as, for example, the profile of the relevant operating data as a function of the last minutes, hours or days.

The machine visualization region 40 contains a simplified illustration 41 of the ring spinning machine 1, with visual status information about materials and running processes; a recipe display 42 with information and in particular name of the current recipe; multiple quick-access buttons 43, 44, 45 for operations that need to be performed frequently by the worker; for example, handling of material; quick access to functions; simple problem solving; simple cleaning of the machine; frequently recurring operations of the machine (for example: ejecting can, applying material . . . ); setting, starting and stopping production orders; etc. a shift change button 46 that enables the indication as to which shift is active; and—in case of notifications—notification icons that are displayed directly on the simplified illustration 41 of the machine.

As mentioned, the basic operating mask 10 according to FIG. 2 is displayed if the operating device 9 is switched to basic mode. The operating device 9 can be designed such that, after a restart of the operating device 9 or the ring spinning machine 1 or after a certain time without interaction of a user with the user interface, it is switched to basic mode.

Figures 3, 4:
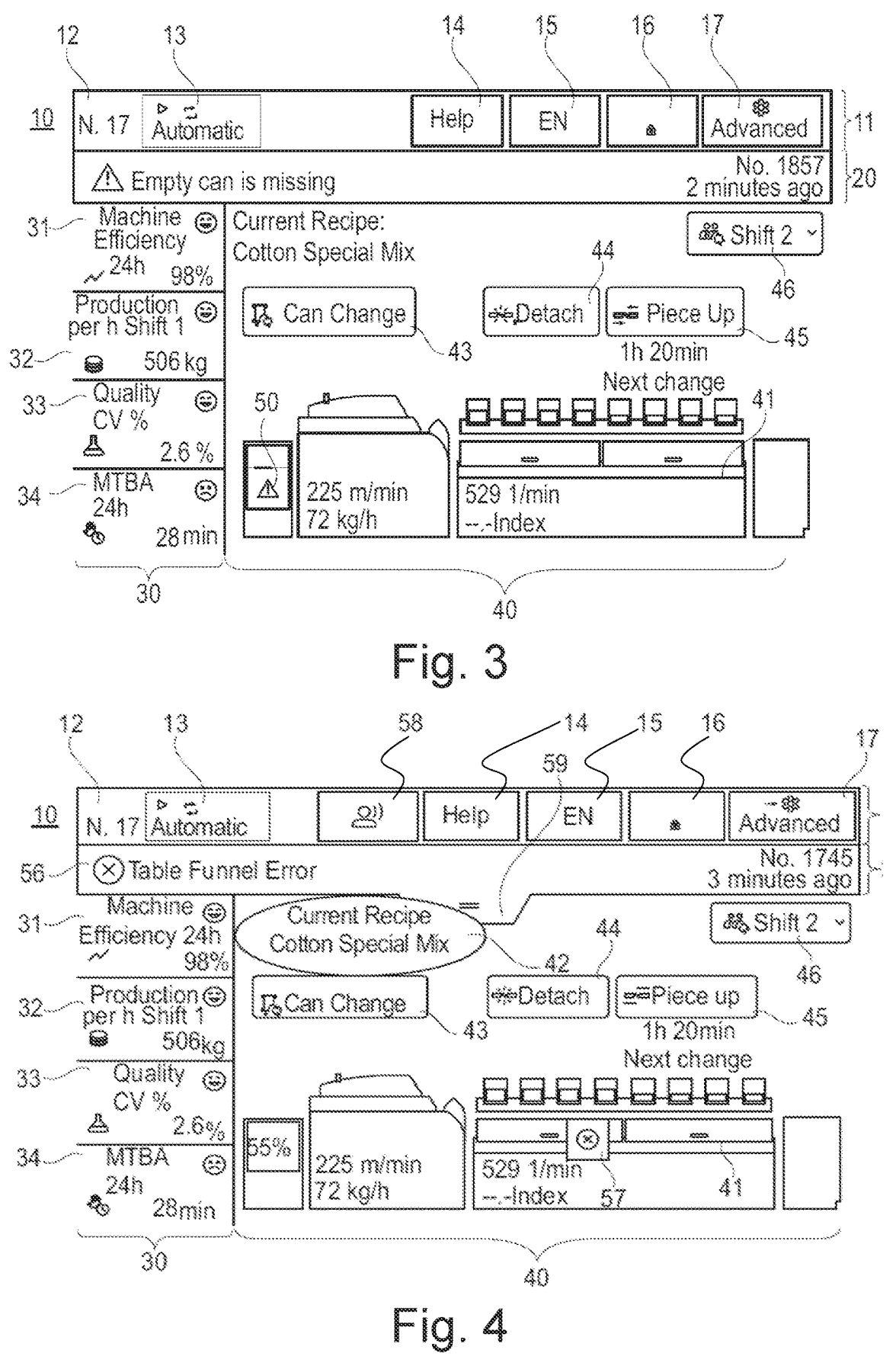

FIG. 3 schematically shows the basic operating mask 10 with an "Empty can is missing" warning message in the notification region 20. For clearer visualization, a symbol that has an exclamation mark arranged in a triangle is placed in front. The message, which may be colored, contains a number "No. 1857" and there is an indication as to when the message was displayed—"2 minutes ago." At the same time, a warning display 50 is displayed on the simplified illustration 41 of the machine (e.g., a colored triangle), which indicates the location of the machine to which the warning message refers.

FIG. 4 schematically shows the basic operating mask 10 with an alarm message 56 ("Table Funnel Error") in the notification region 20. For clearer visualization, a symbol that has a cross arranged in a circle is placed in front. Alarm message 56 contains a number "No. 1745" and there in an indication as to when the message was displayed: "3 minutes ago." A maintenance button 58 for notifying and summoning a maintenance technician is activated in the header 11. In the notification region 20, a button 59 is activated for the simplified display of all notifications (if there is multiple notifications). At the same time, the illustration 41 of the machine comprises a display 57 (e.g., a colored circle with a cross) for indicating the location of the machine to which the alarm message refers.

Figure 5:
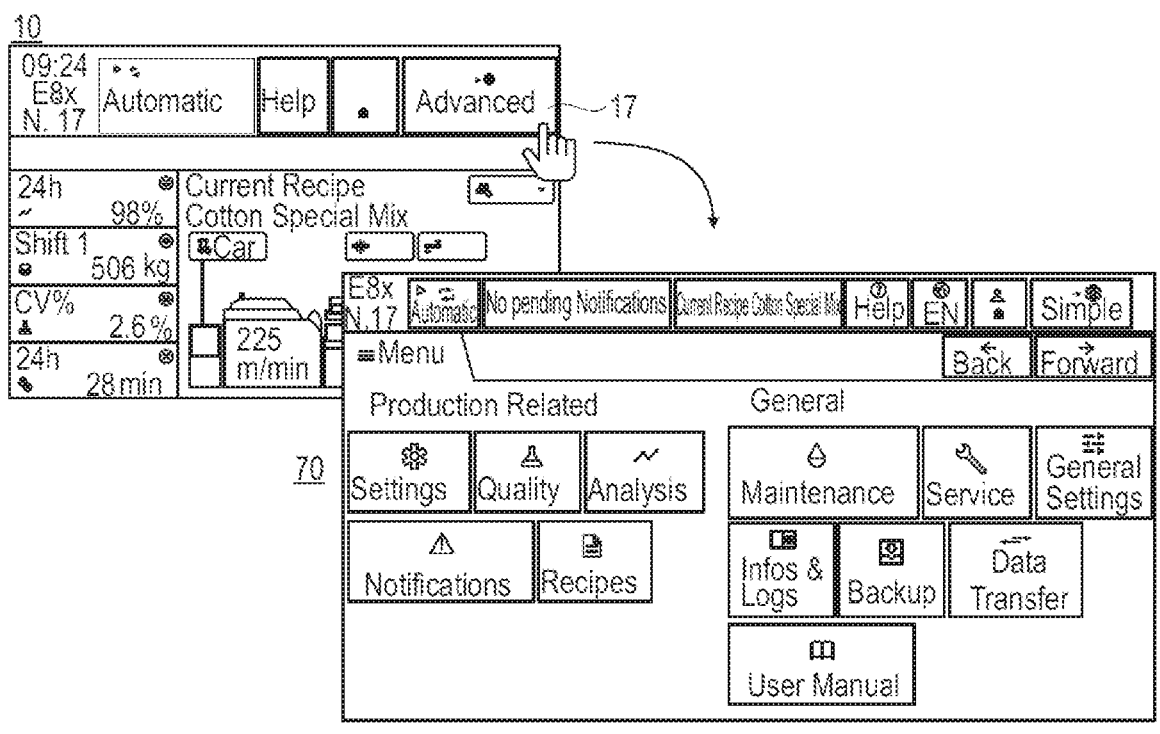
FIG. 5 shows the switching operation from the basic operating mask to an expert operator mask.

FIG. 5 schematically shows the actuation of the switch button 17 for accessing the switching function for switching the operating device 9 from basic mode into expert mode. After actuation of the switch button 17, the expert operating mask 70 is displayed in expert mode.

Switching from basic mode with the displayed basic operating mask 10 ("simple mode") into expert mode with the displayed expert operating mask 70 ("advanced mode") can take place without automatic login or authorization. All users may change between modes at any time. However, only users with the required rights may make changes to the machine setting. The operating device 9 optionally prompts the user to authorize himself if he wants to make a change (see FIG. 7). If the user leaves the expert operating mask 70 and returns to the basic operating mask 10 or basic mode, the authorization of the user is automatically reset or the user is automatically logged out. In one embodiment, the operating device 9 also automatically returns to the basic operating mask 10 or to basic mode after a certain time (adjustable). The basic operating mask 10 and the expert operating mask 70 and the entire visualization may advantageously be based on web technology (for example, HTML5).

Figure 6:
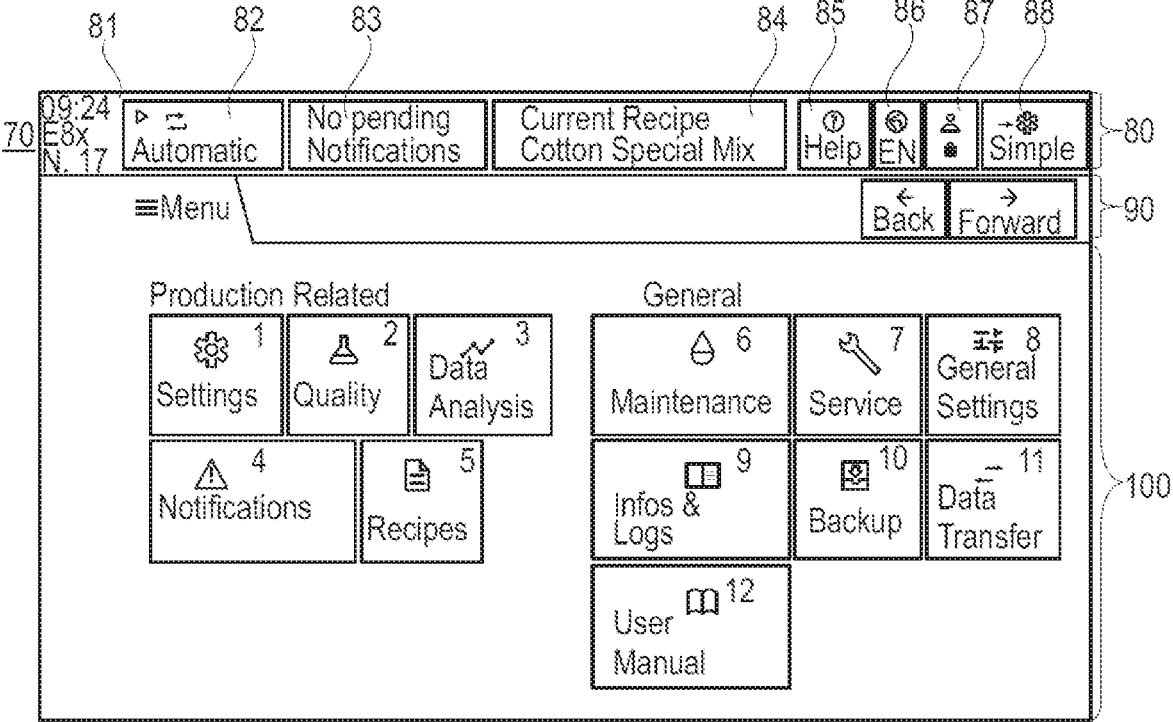
FIG. 6 shows the expert operating mask of the operating device for operating a textile machine in an expert mode.

FIG. 6 schematically shows the expert operating mask 70, which provides the operation of the textile machine T1 by a user in expert mode, wherein more advanced settings or information may be carried out or retrieved than with the basic operating mask 10 in basic mode. The expert operating mask 70 is aimed at an "expert" such as a production expert, quality manager, maintenance technician, etc. and provides access to the entire machine functionality and can also be called "advanced mode." The expert operating mask 70 is adapted to tasks of the "expert," which for example comprises: changes to production settings, fine-tuning, machine optimization, quality management, complex problem solving, troubleshooting, the organization of shifts, support and software updates, etc.

The expert operating mask 70 comprises a header 80, a navigation bar 90 and a menu overview 100. The header 80 is always visible on the expert operating mask 70. Only information and functions necessary on each screen are contained. A machine selection 81 comprises an indication of the machine type, machine number and the current time. A mode 82 indicates the operating state and mode of the machine. The mode 82 such as "Manual," "Automatic," "Service," etc. can be changed here. By pressing the button, a drop-down menu through which settings may be changed appears. A notifications button 83 displays the most important notifications and enables direct access to a notifications list (see FIG. 8). The notifications may have different colors. A recipes button 84 displays the current recipe. By pressing the button, a drop-down menu will appear, with which the following settings may be changed: saving changes to a recipe; restoring a recipe; saving current machine settings as a new recipe; creating new recipes; calling up the recipe list; etc. A help button 85, which can be identical to the help button 14 of the basic operating mask 10. The following may be called up: a help page located above the main screen; an operating manual; a function to take a screenshot of the page; etc. A language selector button 85 enables the setting of the language of the user interface. An authorization button 87 enables the authorization of a user, such as, for example, entry and log-out, in order to change the user and query information about the current user. A switch button 88 enables the actuation of the switching function of the operating device 9 to switch from expert mode to basic mode.

The navigation bar 90 of the expert operating mask 70 always displays the exact current location of the user in the application. It always contains at least the overview page of a main section, e.g. "Settings." As soon as the user navigates within a section, the next navigation level is displayed and the higher level becomes "active," such that the user can return to the higher level with one click. On the left side, the menu overview 100 can be called up directly; on the right side there are buttons for forward and backward navigation.

A menu overview 100 provides access to standardized applications that may have the following features. A settings button 1 ("Settings") enables access to all machine settings, structured according to machine modules or process/task (e.g., "can," "drawing frame," "spinning machine," "combing machine," etc.). Advanced settings may be turned on or hidden depending on the user login level. A quality button 2 ("Quality") enables access to quality-related information and settings (e.g., targets, tolerance levels). A data analysis button 3 enables access to information and an analysis of current production along with trends, structured by topics (e.g., "efficiency," "energy"), with the option of reporting. A notifications button 4 ("Notifications") enables access to a list of active notifications along with a link to notification history and analysis. A recipes button 5 ("Recipes") enables access to a list of all stored recipes with management options (e.g., duplicate, delete, etc.). A maintenance button 6

("Maintenance") enables access to commissioning/troubleshooting functions, e.g. I/O tests, sensors, manual functions, etc. A service button 7 ("Service") enables access to service settings, pending tasks, history, etc. A button for general settings 8 ("General Settings") enables production-related settings and settings that are not directly related to production. These may be transmittable between machines and may comprise: network settings; user management; move settings; view settings; units and measures; time and date; language and keypad; software and licensing; simple mode settings; lamp configuration (if available for this unit); horn configuration (if available for this system); etc. A button for the user manual 12 ("User Manual") enables access to a complete user manual with search capabilities. A button for infos & logs 9 ("Infos & Logs") enables access to general information about the machine (e.g., operating hours) and detailed, filterable lists of all events logged on the device. A backup button 10 ("Backup") provides access to various backup options. A data transfer button 11 ("Data Transfer") provides data transfer options to/from the device, with a list of possible data sets to be transferred. Note: General machine information (e.g., machine number) must always be contained in a transmission to uniquely identify the data.

FIG. 7 shows a dialog mask 105 for authorizing a user or for logging in a user, wherein a user name and a password are queried. The device automatically prompts the user to log in if he wishes to make a change. It is also conceivable for a user to log into the machine with an RFID Tag. The authorization of a user can comprise the assignment of an authorization level, wherein a shift supervisor can be assigned a higher authorization level than a simple operator of a machine.

After a user has authorized himself, the authorization of the user can be reversed again by actuating the authorization button 87, or the user can log out. If the user leaves the expert operating mask 70 and returns to the basic operating mask 10, the user can automatically be logged out. After a certain time (adjustable), the device can also automatically return to the basic operating mask 10 or to basic mode. The operating device can be configured to switch into basic mode after a restart of the machine or an interruption of the power supply.

FIG. 8 shows a list 140 with possible notifications that comprise messages triggered by the system to the user and appear if a user interaction or information of the user is required. There are three significant types of notifications. Alarms are triggered in the event of severe problems, which possibly require or cause a machine stop. Warnings are triggered in the event of problems that may cause an alarm if no action is triggered. Information relates to non-critical notifications that may inform the user about future intervention requirements.

The handling of notifications functions similarly on the basic operating mask 10 and on the expert operating mask 70; only the level of detail varies. Notifications may be handled via four elements. A first element relates to an in-context notification symbol (e.g., warning symbol on the machine model, see FIG. 2). A click on the symbol opens the notification detail as an overlay. A second element relates to a notifications button 83 in the header 80 with the last or most important notification. A click on the region opens the notifications list 140. A third element refers to a notifications list 140 that contains all pending notifications that require user assists (i.e., alarm, alerts, service). A click on one of the notifications opens a notification detail as an overlay. A fourth element relates to the illustration of a notification detail as an overlay with detailed information on the notification (e.g., HTML extract from the user manual for this type of notification) along with options for solution and direct access to the full user manual.

The elements of the basic operating mask 10 and/or the expert operating mask 70 may depend on an authorization of a user or an authorization level of a user.

Figure 9:
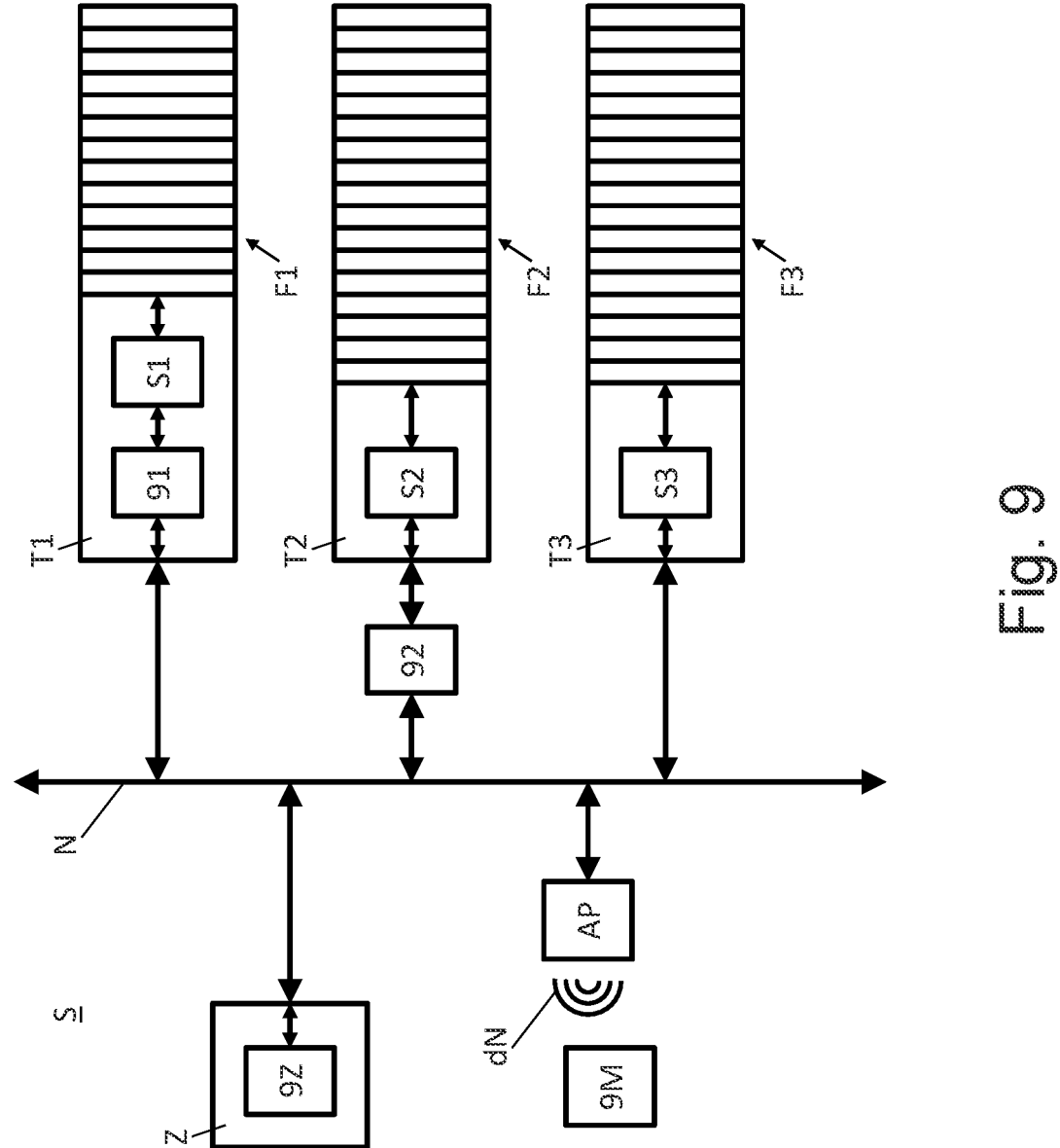
FIG. 9 shows a spinning mill with multiple textile machines and operating devices connected to a communication network.

FIG. 9 schematically shows a spinning mill S comprising a communication network N and devices/machines connected thereto. In the example shown in FIG. 9, the devices/machines refer to a total of three textile machines T1, T2, T3. Furthermore, FIG. 9 schematically shows a spinning mill control center Z and an access point AP for a wireless communication network dN. The spinning mill S can have other configurations, such as more or fewer textile machines, more communication networks, more access points and wireless communication networks, etc. The textile machines may be in the form of spinning preparation machines, such as bale opener, drawing frame, carder, combing machine, etc. The textile machines may be in the form of final spinning machines, such as ring spinning machines, rotor spinning machines, air spinning machines, flyers, winders, etc. As illustrated in FIG. 9, the textile machines T1, T2, T3 have corresponding functional units F1, F2, F3, along with control devices S1, S2, S3 for controlling the textile machines T1, T2, T3. The functional units may relate, for example, to the functional units 2 of the ring spinning machine 1 shown in FIG. 1 or to embodiments of textile machines relating to functional units. The control devices S1, S2, S3 may be designed in the form of programmable controllers (PLC: programmable logic controllers). The control devices S1, S2, S3 may comprise databases and/or may be configured to access databases of the textile machines T1, T2, T3, the spinning mill control center Z, etc.

A first operating device 91 is arranged on a first textile machine T1 and is connected to the communication network N. The first operating device 91 is attached, for example, to the first textile machine T1 and comprises, for example, a touchscreen mounted on the first textile machine T1. The first operating device 91 is connected to the control device S1 of the first textile machine T1, for example via a communication bus.

A second operating device 92 is assigned to a second textile machine T2 and is connected to the communication network N. The second operating device 92 is attached, for example, to an operating panel that is set up in visual distance to the second textile machine T2. The second operating device 92 is connected to the control device S2 of the second textile machine T2, for example via a communication cable. In one embodiment, the control device S2 can be integrated in the operating device 92.

In one embodiment, the control devices S1, S2 and the operating devices 91, 92 may each be arranged in a single unit, for example, the operating devices 91, 92 may each comprise the respective control devices S1, S2.

A third textile machine T3 has a control device S3, which is connected to the communication network N. In contrast to the first and second textile machine T1, T2, no operating device is assigned to the third textile machine T3.

In addition to the operating devices 91, 92, the textile machines T1, T2, T3 may comprise other operating devices, for example, an emergency switch for switching off the textile machine, an illumination switch for switching on an illumination, etc.

The spinning mill control center Z comprises a computer system with processors, software, databases, etc. for controlling, monitoring, etc. of the spinning mill S, which computer system can be arranged, for example, in a structurally separated space. The software of the spinning mill control center Z comprises applications that may collect information and/or data from textile machines, auxiliary spinning devices such as air pressure systems, transport systems, air conditioning systems, sensors, safety and monitoring systems, etc., analyze them, visualize them, provide predictive and/or normative analyses, trigger adaptive control functions, etc. The spinning mill control center Z can transmit settings, e.g. specified or desired values, to the textile machines T1, T2, T3. The spinning mill control center Z comprises an operating device 9Z for setting functions of the spinning mill control center Z. The operating device 9Z comprises, for example, a touchscreen, a monitor with a keyboard/mouse, etc.

As illustrated in FIG. 9, an access point AP is connected to the communication network N. The access point AP provides a wireless communication network dN for creating a communication connection with a mobile operating device 9M. The mobile operating device 9M can be designed, for example, as a tablet computer, a mobile telephone, etc.

The communication network N can be designed in the form of an Ethernet, etc. The wireless communication network dN can be designed in the form of a WiFi network, etc. The communication via the communication network N and/or the wireless communication network dN can in the form of an IP communication (IP: Internet protocol), etc.

The operating devices 91, 92, the operating device 9Z of the spinning mill control center Z, the mobile operating device 9M, the control devices S1, S2, S3 may communicate with one another via the communication network N and optionally the wireless communication network dN. If necessary, the communication to and from the control devices S1, S2 is only possible indirectly via the operating devices 91, 92.

The operating devices 91, 92 of the first and second textile machines T1, T2 have the features described above of the operating device 9 of the ring spinning machine 1. Furthermore, the operating device 9Z of the control center and/or the mobile operating device 9M may also have these features. A relevant operating device, for example the operating device 91 of the first textile machine T1, has a switching function for switching the operating device 91 between a basic mode and an expert mode. Basic mode provides a basic operation of the textile machine T1 and expert mode provides an expert operation of the textile machine T1. For example, the operating device 91 provides the basic operating mask 10 described above and in expert mode the expert operating mask 70 also described above. The operating device 91 has an authorization function for authorizing a user. The switching function is designed to require an authorized user for switching into expert mode. For example, the authorization takes place via a dialog mask 105 described above, which enables the logging in of a user. By way of example, after a user is authorized, a user profile assigned to the user can be activated, wherein expert mode can be designed as a function of the user profile, such that the functions for operating the machine may be provided to a user, to which the user must have access according to his tasks. The operating device 91 has a remote transmission function for creating a communication connection to a remote operating device 92 of a remote textile machine T2 or to a remote control device S2, S3 of a remote textile machine T2, T3 for controlling the remote textile machine T2, T3. The operating device 91 has a remote receiving function for receiving a communication connection from a remote operating device 92, 9Z, 9M to control the textile machine T1. Communication connections may be created, for example, via the communication network N.

Thus, a basic operating mask of the operating device 92 of the second textile machine T2 can be provided to a user on the operating device 91 of the first textile machine T1 for operating the second textile machine T2 in basic mode. Furthermore, a remote user can be provided with a basic operating mask of the operating device 91 of the first textile machine T1 on the operating device 92 of the second textile machine T2 for operating the first textile machine T1 in basic mode.

Thus, an authorized user can be provided with an expert operating mask of the operating device 92 of the second textile machine T2 on the operating device 91 of the first textile machine T1 for operating the second textile machine T2 in expert mode. Furthermore, a remote authorized user can be provided with an expert operating mask of the operating device 91 of the first textile machine T1 on the operating device 92 of the second textile machine T2 for operating the first textile machine T1 in expert mode.

In an analogous manner, it can be provided that a remote user or a remote authorized user is provided with a basic operating mask or an expert operating mask on the operating device BZ of the spinning mill control center BZ or on the mobile operating device BM for operating the first textile machine T1 in basic mode or expert mode.

Figure 10:
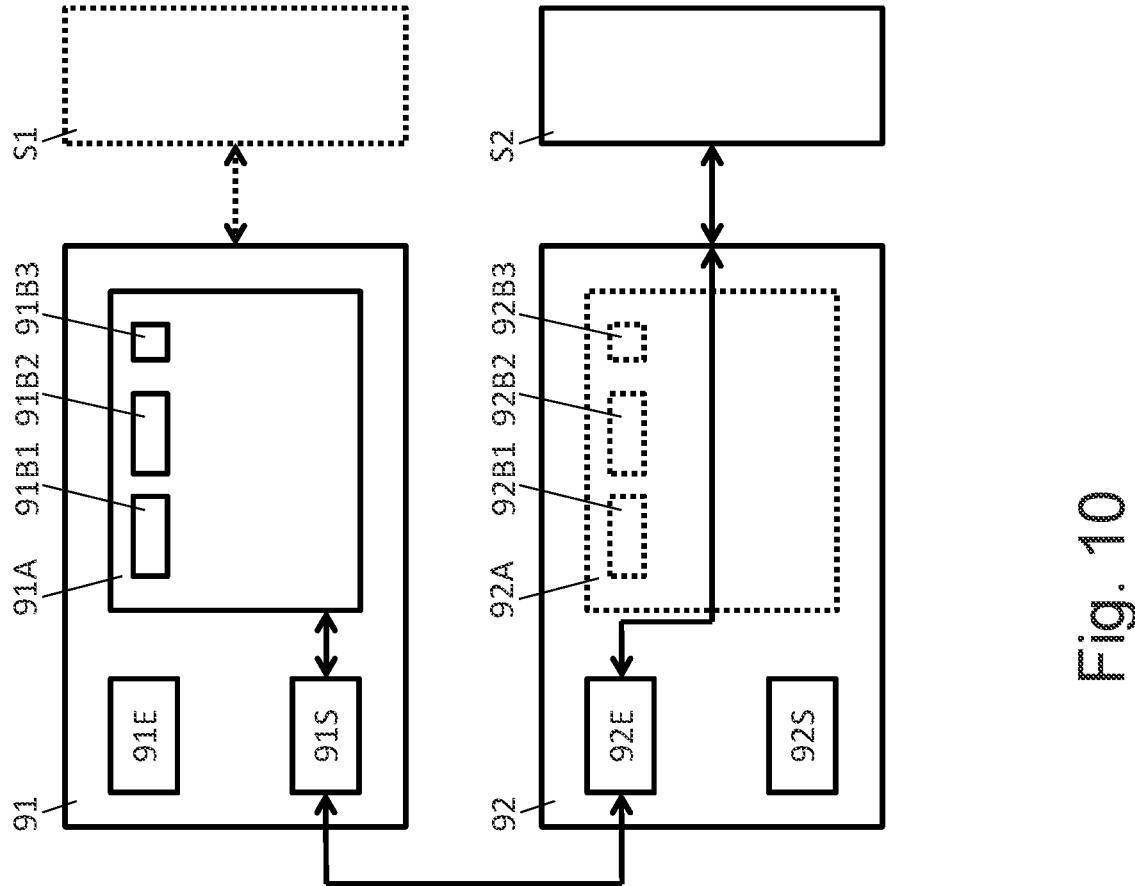
FIG. 10 shows an arrangement with two operating devices for operating the control devices of textile machines, wherein a first operating device is connected to the control device of the second textile machine for operating a second textile machine.

FIG. 10 schematically illustrates an arrangement with two operating devices 91, 92 for operating the control devices S1, S2 of textile machines, wherein a first operating device 91 is connected to the control device S2 of the second textile machine for operating a second textile machine. The operating devices 91, 92 each comprise a remote transmission function 91S, 92S and a remote receiving function 91E, 92E. The remote transmission function 91S of the first operating device 91 has a communication link created to the operating device 92 of the second textile machine, which communication link is received by the remote receiving function 92E of the second operating device 92. The operating devices 91, 92 comprise displays 91A, 92A for displaying operating masks with operating elements 91B1, 91B2, 91B3, 92B1, 92B2, 92B3, in particular the basic operating mask 10 described above and the expert operating mask 70 described above. The operation of the control device S1 of the first textile machine by the operating device 91 is exposed. This is illustrated schematically in FIG. 10 by dashed lines. The display 92A of the operating device 92 of the second textile machine is exposed. This is illustrated schematically in FIG. 10 by dashed lines. The control device S2 of the second textile machine is operated by selecting operating elements 91B1, 91B2, 91B3 shown on the display 91A, for example by means of a touchscreen or a mouse, and transmitting corresponding information/data via the remote transmission function 91S of the operating device 91, the remote receiving function 92E of the operating device 92 to the control device S2 of the second textile machine.

In one embodiment, it can be provided that only one user can be authorized to operate a textile machine T1, T2. A read-only mode can nevertheless be available for other users. The read-only mode can be displayed in the relevant operating device on the basis of a coding, e.g. via a colored frame and/or by marking a switch area.

In one embodiment, a handshake procedure can be provided so that a user can take over the authorization of an authorized user. For example, a corresponding message that another user wishes to take over the authorization can be displayed to the authorized user. The authorized user can respond by confirming the authorization of the other user and sending his own authorization or by denying the authorization of the other user and maintaining his own authorization. It can be provided that, after a predetermined time interval, a user can take over the authorization even without reaction of the authorized user, for example if the authorized user is no longer found in the operating device. The handshake procedure can be dependent on the authorization levels of the users concerned, wherein a user with a lower authorization level being able to trigger the handshake procedure against a user with a higher authorization level can be blocked. A user who triggers the handshake procedure can be shown the user by whom the authorization is taken over, wherein the user can cancel the handshake procedure if necessary. If necessary, a user can reject the taking over of authorization for a certain period of time or for a certain number of requests, after which the taking over of authorization can no longer be rejected.

In one embodiment, it can be provided that a higher priority is assigned to an operating device 91, 92 of a relevant textile machine T1, T2 than other operating devices 91, 92, 9Z, 9M, wherein a user of the relevant operating device 91, 92 takes over the authorization of a remote user originating from another operating device 91, 92, 9Z, 9M even without the specified handshake procedure. It can be provided that it is displayed to the local user that a remote user is authorized and that a confirmation to cancel the authorization of the remote user is required by the local user.

In one embodiment, it can be provided that the operation by remote users is restricted or blocked. This can be designed in a configurable manner and can be dependent on the following: which operating devices 91, 92, 9Z, 9M are involved, whether the local or remote user has selected basic mode or expert mode, etc. For example, it can be provided that a cleaning control such as UNIcontrol can be operated only by a local user of an operating device, while this is blocked for a remote user. For example, it can be provided that alarms may only be confirmed by a local user, while alarms may be displayed to a remote user, but a confirmation for the remote user is blocked. For example, it can be provided that alarms may be confirmed only at the operating device 9Z of the control center, but not on the operating devices 91, 92 of the first or second textile machine T1, T2. For example, it can be provided that the transfer of predetermined settings/files from the operating device 9Z to the spinning mill control center Z on an operating device 91, 92 of the first or second textile machine T1, T2 or on control devices S1, S2, S3 of the textile machines T1, T2, T3 is independent of the authorization of a user, wherein the activation of relevant settings/files requires an authorized user. Such settings/files may refer to user settings, shift settings, recipe settings, etc.

In one embodiment, it can be provided that the remote transmitting function and/or the remote receiving function of the operating devices 91, 92, 9Z, 9M can be deactivated. For example, in the case of service work on the first textile machine T1, the remote receiving function of the operating device 91 of the first textile machine T1 can be deactivated in order to prevent a disruption of the service work by a remote user. By way of example, the deactivation of the remote transmission function and/or the remote reception function can be dependent on the operating devices involved. Thus, for example, the remote receiving function of the operating device 91 of the first textile machine T1 can be deactivated for the operating device 92 of the second textile machine T2, while the latter is still activated for the operating device 9Z of the spinning mill control center Z.

In one embodiment, it can be provided that a remote user is assigned a higher authorization level than the local user, such as a shift supervisor, wherein the remote user can put the local user, for example a less experienced operator, into read-only mode or basic mode, and enable operation in expert mode, whereby mutual warning messages may be provided.

In one embodiment, it can be provided that a local user can reset all other authorizations of other users after authorization, for example, so that an urgent action detected on the machine can be taken or a malfunction/faulty setting that may not be detected by a remote user can be corrected.

In one embodiment, it can be provided that the spinning mill control center can be assigned a highest priority and the authorization of a local or remote user of an operating device can be reset to completely take over the operation of a textile machine.

In one embodiment, it can be provided that a user is granted access to extended information/settings of a relevant machine after the authorization, wherein the change of information/settings can be restricted or can be completely released.

In one embodiment, it can be provided that the operating devices may assume a standby mode, for example after a time interval has elapsed without operation by a user, wherein no or limited information/settings of the machine are displayed. After a user is authorized, access to information/settings of the machine may be dependent on an authorization level of the user, in particular also depending on whether the user selects basic mode or expert mode, wherein advanced access can be granted in expert mode to make changes to information/settings.

In one embodiment, it may be provided that the operation of a textile machine is taken over by a software application, such as ESSENTIAL, wherein a local or remote user is warned if necessary or is offered the option of preventing or restricting operation by the software application.

LIST OF REFERENCE SIGNS

1 Ring spinning machine
x Longitudinal direction of the ring spinning machine
2 Spinning positions
$3_1$ Head of the ring spinning machine 1
$3_2$ Foot of the ring spinning machine 1
4 Roving bobbin
5 Drawing frame
6 Roving
7 Cop
8 Spindle
9 Operating device
10 Basic operating mask
11 Header
12 Machine selection
13 Operating state button
14 Help button
15 Language selector button
16 Authorization button
17 Switch button to switch from basic mode to expert mode
20 Notification region
30 Operating data region
31 Display of machine efficiency
32 Display of the shift
33 Display of quality status
34 Display of the average time period between assists
Machine visualization region 41 Illustration of the machine
42 Recipe display
43, 44, 45 Quick-access buttons
50 Warning display
56 Alarm message
57 Display to indicate the location of the alarm message
58 Maintenance button
59 Button for the simplified display of notifications
70 Expert operating mask
80 Header
81 Machine selection
82 Mode of the machine
83 Notifications button
84 Recipes button
85 Help button
86 Language selector button
87 Authorization button
88 Switch button to switch from expert mode to basic mode
90 Navigation bar
100 Menu overview
105 Dialog mask for authorizing a user
140 List of Notifications
T1, T2, T3 Textile machines
Z Spinning mill control center
N Communication network
dN Wireless communication network
AP Access point
91, 92 Operating devices of the textile machines
S1, S2, S3 Control devices of the textile machines
9Z Operating device of the spinning mill control center
M Mobile operating device

The invention claimed is:

1. A first operating device configured for a user to operate an assigned textile machine, comprising; one or more processors configured to execute instructions comprising:
   a user interface configured to present the following to the user:
   a basic operating mask display that enables the user to use a basic operation mode of the textile machine, and an expert mode function that provides an expert operating mask display that enables the user to use an advanced expert operation mode of the textile machine,
   a switch button presented on the operating mask display and the expert operating mask display that enables a switching function by the user between the basic operation mode and the expert operation mode, the switching function requiring authorization for the user to change operation of the textile machine in the expert operation mode;
   a remote transmitting selector that enables a remote transmission function wherein the user communicates with a second operating device assigned to a remote textile machine to operate the remote textile machine in the basic operation mode or expert operation mode via the first and second operating devices; and
   a remote receiving selector that enables a remote receiving function wherein the first operating device receives communications from the second operating device assigned to the remote textile machine so that a remote user can operate the textile machine in the basic operation mode or expert operation mode from the remote textile machine via the second and first operating devices.

2. The first operating device according to claim 1, wherein the remote transmitting function creates a communication connection to the remote textile machine via the second operating device or via a control device of the remote textile machine.

3. The first operating device according to claim 2, wherein the remote transmitting function requires user authorization prior to establishing communication with the second operating device.

4. The first operating device according to claim 3, wherein the remote transmission function requires operation of the first operating device in the expert operation mode prior to establishing communication with the second operating device.

5. The first operating device according to claim 3, wherein the remote transmitting function is configured to perform an authorization check prior to establishing communication with the second operating device.

6. The first operating device according to claim 1, wherein the remote transmitting function is configured to communicate with a plurality of the second operating devices at a respective plurality of remote textile machines.

7. The first operating device according to claim 1, wherein the remote receiving function requires operation of the first operating device in the basic mode prior to establishing communication with the second operating device.

8. The first operating device according to claim 7, wherein the remote receiving function is configured to reset an authorization of the user when establishing communication with the second operating device.

9. The first operating device according to claim 8, wherein the remote receiving function is configured to wait for a time-limited user acknowledgment to reset the authorization of the user.

10. The first operating device according to claim 1, wherein operation of the textile machine via the first operating device or the second operating device is dependent on an authorization level assigned to the user or the remote user.

11. The first operating device according to claim 1, wherein one or more functions of the operating device is in communication with and receives are dependent on information stored in a spinning mill control center.

12. The first operating device according to claim 1, wherein the first operating device is configured for setting of operational parameters of the textile machine or the remote textile machine.

13. The first operating device according to claim 12, wherein information about operation of the textile machine or the remote textile machine is provided on the first operating device, the information comprising: alarms or warning messages, and whether the textile machine or the remote textile machine is in the basic mode or the expert mode.

* * * * *